A. Beekman,
Making Fellies.
Nº 46,966.   Patented Mar. 21, 1865.

Witnesses.
Theo. Tusch
Wm. Trewin

Inventor
A. Beekman

UNITED STATES PATENT OFFICE.

A. BEEKMAN, NEW YORK, N. Y., ASSIGNOR TO THEODORE AND CHARLES WENZEL, OF SAME PLACE.

IMPROVEMENT IN SAWING-MACHINES.

Specification forming part of Letters Patent No. 46,966, dated March 21, 1865.

*To all whom it may concern:*

Be it known that I, A. BEEKMAN, of the city, county, and State of New York, have invented a new and useful Improvement in Machines for Sawing Curved Stuff, such as Chair-Backs, Fellies, &c.; and I do hereby declare that the following is a full, clear, and exact description thereof, which will enable any person skilled in the art to make and use the same, reference being had to the accompanying drawings, making a part of this specification, in which—

Figure 1:
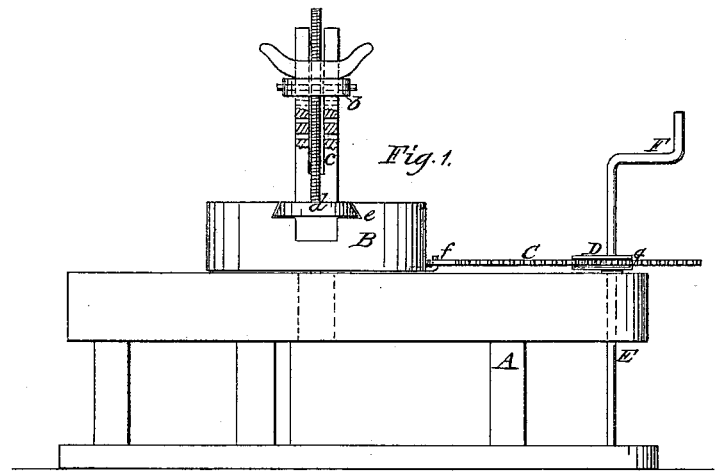
Figure 2:
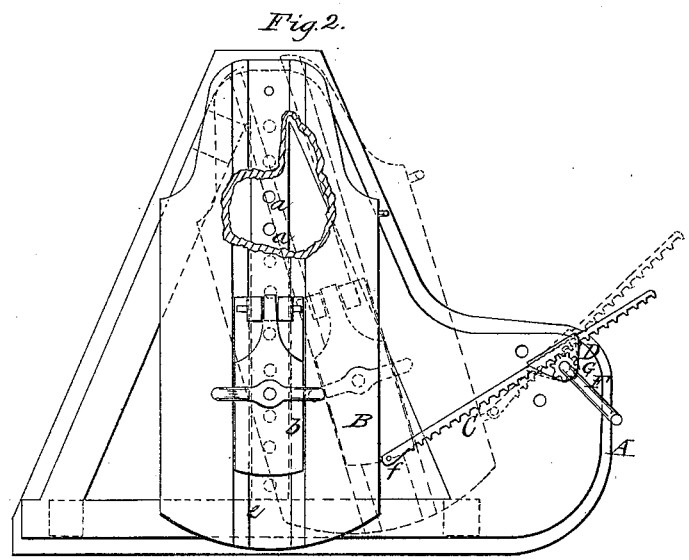

Figure 1 is a front or end view of my invention; Fig. 2, a plan or top view of the same.

Similar letters of reference indicate corresponding parts in the two figures.

This invention relates to a new and useful means employed for feeding the bolt to the saw of sawing-machines, designed for sawing curved stuff—such, for instance, as chair-backs, fellies, and other articles which are sawed in the form of segments of circles. In machines of this class the bolt has hitherto been attached or clamped to a radius-bar moved by hand and consequently with considerable labor.

My invention consists in applying a rack to the radius-bar, and actuating the former by means of a pinion, which gears into the rack, and is kept in gear therewith by means of a strap, all being arranged as hereinafter fully shown and described, whereby the radius-bar may be operated with the greatest facility and from different centers, as may be required.

A represents the portion of the framing of a sawing-machine, and B represents a radius-bar, which works on a screw or bolt placed in any of a series of holes, *a*, in the bar B, according to the sweep desired to be given the bolt to be sawed. The bolt is secured to the bar B by means of a clamp, composed of a jaw, *b*, and screw *c*, attached to a slide, *d*, which is fitted in a groove, *e*, made longitudinally in the bar B.

C is a rack, one end of which is fitted on a pin, *f*, attached to one side of the bar B. This rack C passes loosely through a strap, D, which is fitted loosely on a vertical shaft, E, in the framing A, said shaft having a crank, F, on its upper end and having a pinion, G, upon it, which is within the strap D and gears into the rack C.

By this arrangement it will be seen that by turning the shaft E the rack C will be moved in consequence of the pinion G gearing into it, and that the curvilinear movement of the radius-bar B is compensated for by the turning of the strap D on the shaft E, as will be fully understood by referring to Fig. 2, in which a second position of the bar B is shown in red outline.

This arrangement not only admits of the radius-bar B being moved with facility, but it also admits of the rack C being attached to it at any convenient point, whereby the shifting or placing of its pivot-bolt renders it most convenient.

The saw is not shown, nor is it necessary, as it may be arranged in the usual or in any proper way adjoining the end of the bar B, so as to saw the stuff from the bolt in segment form corresponding to the arc of the circle through which the end of the bar B moves, said arc being varied as may be desired by shifting the pivot-bolt of B in any of its holes *a*.

Having thus described my invention, what I claim as new, and desire to secure by Letters Patent, is—

The rack C, in combination with the pinion G and strap D, placed on the vertical shaft E, and all arranged with the radius-bar B, to operate in the manner as and for the purpose herein set forth.

A. BEEKMAN.

Witnesses:
THEO. TUSCH,
M. M. LIVINGSTON.